United States Patent Office 2,781,397
Patented Feb. 12, 1957

2,781,397
PROCESS FOR PREPARING POLYCYCLIC DIBASIC ACID

Herbert K. Wiese and James H. McAteer, Cranford, N. J., assignors to Esso Research and Engineering Company, a corporation of Delaware No Drawing. Application December 30, 1953, Serial No. 401,437

9 Claims. (Cl. 260—514)

This invention relates to the production of alkali metal salts of polycyclic dicarboxylic acids and dicarboxylic acids resulting therefrom. More particularly, it is concerned with an improved process for the production of alkali metal salts of dicarboxylic acids and the acids themselves, derived primarily from cyclodienes, such as cyclopentadiene and alkyl-substituted cyclodienes, such as methylcyclopentadiene, or from mixtures of dienes such as mixtures of cyclopentadiene and methylcyclopentadiene.

Starting with cyclopentadiene one obtains according to the process of this invention, dicyclopentadiene-3,7-dicarboxylic acid which was first prepared by Thiele: Berichte 34, 68 (1901) by treating cyclopentadiene with metallic potassium with subsequent gassing of the potassium cyclopentadiene with carbon dioxide at atmospheric pressure. Decomposition of the di-potassium salt with acid yielded the above dicyclopentadiene dicarboxylic acid. As he stated in a footnote, Thiele's attempts to cause cyclopentadiene to react with sodium were unsuccessful.

Recently, Cohen and Mikeska (U. S. patent application Serial Number 268,122, filed January 24, 1952, now Patent No. 2,716,662, and assigned to applicants' assignee) found that dicyclopentadiene dicarboxylic acid and dialkyl homologues of this acid are readily prepared in high yields by reacting metallic sodium which has been dispersed to a finely divided state, that is, to an average particle size of less than 50 microns in diameter, with monomeric cyclodienes, e. g., cyclopentadiene or alkyl cyclopentadiene in the presence of a small amount of an anhydrous alcohol activator, followed by conversion of the sodium cyclopentadienes to acid by treatment with $CO_2$ preferably at superatmospheric pressures up to 1000 p. s. i. g.

It has now been found that the yields of dicarboxylic acids resulting from the process of Cohen and Mikeska can be further increased by carrying out the reaction in such a manner that the alkali metal cyclodienyl is added to a reaction zone containing an inert hydrocarbon containing dissolved $CO_2$. Preferably, a slurry of finely divided cyclodienyl sodium in an inert hydrocarbon such as xylene is prepared, as will be later explained, and added to a saturated solution of $CO_2$ in the same or other inert hydrocarbon. The $CO_2$ content of the solution should preferably be in excess over that required for the carboxylation of the metal cyclodienyl.

It has been found that, by utilizing the improved process of this invention, higher yields of dibasic acids are obtained, that undesirable acidic by-products are avoided, and that the process can be carried out at relatively low pressures, preferably less than 100 p. s. i. g.

The reaction between the alkali metal cyclodienyl and the $CO_2$ takes place at a temperature in the range of —50° to +250° C., preferably in the range of 20° to 100° C. The $CO_2$ pressure can range from <1 to 1000 p. s. i. g., the latter being the approximate tank pressure of $CO_2$ available commercially. Pressures in the range of <1 to 100 p. s. i. g are preferred. The rate at which the alkali metal cyclodienyl is fed into the reactor is a function of the carboxylation conditions such as $CO_2$ pressure, temperature, and degree of agitation in the reaction zone. In brief, in order to realize the advantages of this process the carboxylation should be carried out in a manner such that an excess of $CO_2$ is present at all times. The carboxylation can be carried out either batchwise or in a continuous type process. One way of carrying out the continuous type of operation consists in feeding the alkali metal cyclodienyl into the bottom of a reactor and continuously withdrawing carboxylated salt at the top of the reactor. The residence time can be varied depending on conditions such as those mentioned above from times less than one minute to approximately thirty minutes.

The alkali metal, e. g., sodium, potassium or lithium, employed in this reaction is in the form of a finely divided dispersion wherein the particles have an average size of less than 50 microns in diameter. Dispersion is obtained, for example, by mechanical means either with or without the aid of emulsifying or dispersing agents. An alcohol activator, e. g., substantially anhydrous alcohol, such as the low molecular weight aliphatic alcohols such as methanol, ethanol, isopropanol, etc., is preferably employed. Alcohols containing up to four carbon atoms per molecule are suitable but methanol, ethanol or isopropanol are preferred. The alcohol is employed in relatively small amounts, that is, less than 1 molecule based on the sodium and usually in amounts less than 1/10 mole equivalent. The alcohol serves to activate the sodium either by removing surface impurities contained thereon or by forming small quantities of sodium alcoholate. Thus, if sodium is previously dispersed to a very finely divided state, preferably having a particle size of less than 50 microns in diameter, e. g., by mixing with xylene, heating to above the melting point of the sodium and then passing the mixture through a high-speed colloid mill and continuing the operation until the temperature falls below the solidification point of the sodium, one obtains the sodium in a highly reactive state. With sodium in such a finely divided state some reaction may be obtained with cyclopentadiene, but the reaction tends to be relatively slow. If to a mole of dispersed sodium there is added 1 to 2 grams of anhydrous ethyl- or isopropyl alcohol so as to activate the sodium either by removing, by means of solution, surface impurities or by forming small quantities of sodium alcoholate, immediate reaction may be obtained when a mole of monomeric cyclopentadiene is added to the dispersed sodium.

The hydrocarbon employed in the preparation of the slurry of alkali metal dispersion can be any inert aromatic hydrocarbon such as xylene, toluene, benzene, etc., such aliphatic materials as heptane, hexane, mixtures thereof, light naphthas, such as Varsol, etc. These same hydrocarbons or any one of them are likewise suitable for use in the preparation of the solution of $CO_2$ to which the alkali metal cyclodienyl is added in the carboxylation step of this invention.

The essential steps in the cyclodiene dibasic acid process are as follows with respect to sodium and cyclopentadiene:

(1) Preparation of sodium cyclodiene derivative:

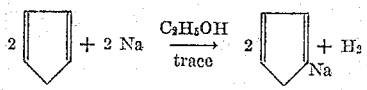

(2) Carboxylation and dimerization of the sodium derivative:

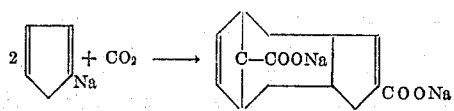

(3) Acidification and purification of the dibasic acid.

To illustrate the effectiveness of the processes of this invention runs have been carried out in which a slurry of cyclopentadienyl sodium prepared as aforesaid was fed intermittently into a stainless steel turbo-mixer containing xylene saturated with $CO_2$ under various pressures. The temperature of the reaction mixture ranged from 20° C. to 44° C. For comparative purposes a series of runs was made by the reverse procedure of adding $CO_2$ under pressure directly into the slurry of sodium cyclopentadienyl. These results are as follows:

Based on the proposed mechanism for the side reaction it is apparent that good $CO_2$ contact must be provided in order to reduce the formation of undesirable by-products. That this is realized by the procedure claimed is evident from the results obtained.

Since the carboxylation of the cyclodienyl sodium is highly exothermic the older technique of carboxylation creates a problem of removing the heat of reaction particularly in large scale type operations. The improved process here claimed has the added advantage, in addition to the advantages already recited, of providing bet-

TABLE I

*Preparation of dicarboxylic acids from cyclopentadiene and methylcyclopentadiene*

| Run No. 927 | 109 | 113 | 115 | 117 | 119 | 121 | 145 | 147 | 1011-15 | 103 | 149 | 1011-3 |
|---|---|---|---|---|---|---|---|---|---|---|---|---|
| Cyclodiene used | CPD g | CPD g | CPD g | CPD g | CPD g | CPD g | CPD g | CPD g | CPD g | MCPD h | MCPD h | MCPD+CPD j |
| Charge: | | | | | | | | | | | | |
| Cyclodienyl sodium, moles | 1.43 | 1.5 | 1.5 | 1.5 | 0.51 | 0.68 | 1.52 | 1.50 | 1.41 | 1.5 | 1.33 | 1.15 |
| Suspended in xylene, ml | 1,000 | 600 | 600 | 600 | 200 | 300 | 600 | 600 | 600 | 750 | 600 | 600 |
| Conditions of carboxylation: | | | | | | | | | | | | |
| Manner of carboxylation | 1 A | 1 A | 1 A | 1 A | 2 B | 3 C | 2 B | 2 B | 2 B | 1 A | 2 B | 2 B |
| $CO_2$ pressure, p. s. i. g | 40 | 500-1,000 | 1-5 | 500-1,000 | 40 | <1 | 40 | 10 | 80 | 500-850 | 40 | 40 |
| $CO_2$ contact time, hrs | 3 | 3 | 2.75 | 3 | 0.75 | 1 | 0.5 | 0.5 | 0.5 | 15 | 0.5 | 0.5 |
| Temperature, °C | 25-60 | 25-70 | 24-35 | 25-60 | 39-44 | -50 to ? | 20-25 | 20-25 | 20-25 | 25-60 | 20-25 | 20-24 |
| Xylene in reactor, ml | l 1,000 | l 750 | l 1,250 | l 750 | 800 | 800 | 800 | 800 | 800 | l 750 | 800 | 800 |
| Acids recovered, gm.: | | | | | | | | | | | | |
| Dicarboxylic a | 102.5 | 111.5 | 93.6 | 115.8 | 51.8 | 74.3 | 149 | 148 | 149 | 149 | 164 | 128 |
| By-product b | 20.9 | 25.4 | 24.6 | 16.6 | 1.8 | 1.6 | 10.5 | 10.0 | 9.0 | | 5.3 | 5.7 |
| Acid No. on acids, meq./gm.: | | | | | | | | | | | | |
| Dicarboxylic a | d 8.96 | d 8.94 | d 8.94 | d 8.91 | d 9.10 | 8.97 | d 9.00 | d 8.99 | d 8.90 | e 7.65 | 7.79 | k 8.48 |
| By-product b | 7.24 | 7.12 | f 7.79 | 7.90 | 8.10 | 7.79 | 8.61 | 8.50 | 5.88 | | 6.16 | 6.00 |
| Conversion of cyclodienyl sodium to, mole percent: | | | | | | | | | | | | |
| Dicarboxylic c | 64.2 | 66.5 | 55.8 | 68.8 | 95.8 | 97.9 | 88.5 | 88.7 | 94.0 | 76.0 | 96.2 | 94.4 |
| By-product acid c | 10.6 | 12.0 | 12.6 | 8.7 | 2.9 | 0.2 | 6.0 | 5.6 | 3.7 | | 2.4 | 3.0 |
| Total organic acids | 74.8 | 78.5 | 68.4 | 77.5 | 98.7 | 98.1 | 94.5 | 94.3 | 97.7 | | 98.6 | 97.4 |
| Non-organic acid | 25.2 | 21.5 | 31.6 | 22.5 | 1.3 | 1.9 | 5.5 | 5.7 | 2.3 | | 1.4 | 2.6 |
| Selectivity to dicarboxylic acid, mole percent i | 85.8 | 84.8 | 81.5 | 88.8 | 96.4 | 99.5 | 93.7 | 94.0 | 96.2 | | 97.7 | 96.8 |

1 $CO_2$ fed into reactor containing the cyclodienyl sodium suspended in xylene.
2 Cyclodienyl sodium suspended in xylene fed into reactor containing inert liquid saturated with $CO_2$.
3 Cyclodienyl sodium fed into glass beaker containing xylene and excess solid Dry Ice.
a Insoluble acid removed by filtration from acidified aqueous solution of carboxylated sodium salt.
b Mixture of acids soluble in filtrate. Acids contain carbonyl groups in addition to carboxyl groups. Based on solubility of product dicarboxylic acid in water, the amount of same expected in filtrate should be about 15% of total acids present.
c Calculated from acid number.
d Theoretical for dicyclopentadiene dicarboxylic acid 9.08 meq./gm.
e Theoretical for dimethyl dicyclopentadiene dicarboxylic acid 8.05 meq./gm.
f Carbonyl No. 3.02 meq./gm. (=C=O).
g CPD=cyclopentadiene monomer.
h MCPD=methylcyclopentadiene monomer.
i Based on total organic acids recovered.
j Mixture consisting of 50 wt. percent CPD and 50 wt. percent MCPD.
k Theoretical for a 50-50 mixture 8.56 meq./gm.
l Represents total volume of xylene. Xylene used in making cyclodienyl sodium+xylene in reactor.

The data in Table I demonstrate that the $CO_2$ solution procedure (runs 119, 145, 147, 149, 1011-3, and 1011-15) results in a marked improvement in both the conversion of the sodium cyclodienyl to recoverable organic acids and selectivity to desired dicarboxylic acid.

The exact composition of the undesirable organic acidic by-product normally obtained in the carboxylation reaction has not been determined. It has been observed, however, that this product contains carbonyl groups in addition to the carboxyl groups. Although the acid number is considerably lower than that of the desired dibasic acid, it is about 25 times more soluble in water and therefore can be separated from the reaction product. The color of this acidic by-product has ranged from yellow to black.

It is believed that the formation of the acidic by-product, particularly the formation of carbonyl groups, may be due to the reaction of the cyclodienyl sodium with the carboxylated salt producing a derivative containing a group such as:

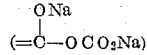

The latter on acidification liberates $CO_2$, which was observed in most runs, resulting in the formation of a carbonyl group. This side reaction also results in a low utilization of the sodium to recoverable organic acids.

ter temperature control. The dicyclodiene dicarboxylic acids produced by this invention are prepared from the sodium salts thereof by well-known simple hydrolysis procedures such as treatment of the salt with aqueous solutions of dilute mineral acid. Thus, the salt is conveniently converted to the free acid by dissolving the salt in water and precipitating the acid by addition of dilute HCl or $H_2SO_4$ and recovering the acid crystals by filtration. The crude product can be recrystallized from approximately 50% aqueous methanol or approximately 70% aqueous acetic acid.

The dicyclopentadiene dicarboxylic acid has many useful properties industrially, e. g., higher alcohol esters of either the unsaturated acid or the fully hydrogenated acid are useful as solvents and plasticizers for resins and coating materials. It is also useful as a modifier for the production of alkyd resins when mixed with other suitable ingredients and may serve as a basic material for the production of polyester types of lubricants, as an ingredient of specialty greases and as a source of other compounds.

Hydrogenated derivatives, e. g., dihydrodicyclopentadiene dicarboxylic acid, which are prepared by hydrogenation of the acid in the presence of a hydrogenation catalyst such as Adams platinum oxide are excellent replacements for phthalic anhydride in soybean-alkyd resin. The acid itself is likewise a good substitute.

In addition to the use of relatively pure cyclopentadiene and methylcyclopentadiene in the above described process, good yields of high quality acids are also obtained by reacting mixtures of these two components. For example, suitable mixtures may contain 90% to 10% of cyclopentadiene and 10% to 90% of methlcyclopentadiene. In addition vapor phase steam cracked hydrocarbons boiling in the range of cyclopentadiene and methylcyclopentadiene containing paraffins and aromatics as diluents may also be employed. The acid products in such cases are mixtures of the dicyclopentadiene dicarboxylic acid, dimethyl dicyclopentadiene dicarboxylic acid, and methyldicyclopentadiene dicarboxylic acid.

Having described the invention in a manner such that it may be practiced by those skilled in the art, what is claimed is:

1. An improved process for producing an alkali metal salt of cyclodiene dicarboxylic acids which comprises feeding a cyclopentadienyl of an alkali metal into a body of inert liquid hydrocarbon containing an excess of dissolved $CO_2$ in a reaction zone and recovering alkali metal cyclodiene dicarboxylic acid salt from the reaction zone.

2. A process for producing alkali metal salts of cyclodiene dicarboxylic acids which comprises reacting a finely divided alkali metal with a cyclopentadiene hydrocarbon to form an alkali metal cyclodienyl, feeding the alkali metal cyclodienyl into a body of inert hydrocarbon containing an excess of $CO_2$, and recovering alkali metal cyclodiene dicarboxylic acid from the reaction mixture.

3. A process according to claim 2 in which the alkali metal is sodium and in which the cyclodiene is selected from the group consisting of cyclopentadiene, methylcyclopentadiene and mixtures thereof.

4. An improved process for producing a cyclodiene dicarboxylic acid which comprises reacting a finely-divided alkali metal with a cyclodiene hydrocarbon selected from the group consisting of cyclopentadiene, methylcyclopentadiene and mixtures thereof in the presence of a small amount of an aliphatic alcohol activator to form an alkali metal cyclodienyl, feeding the alkali metal cyclodienyl into a body of inert liquid hydrocarbon containing dissolved $CO_2$ in a reaction zone at a temperature between $-50°$ and $250°$ C., the amount of dissolved $CO_2$ present being in excess of the amount required for carboxylation of the metal cyclodienyl recovering alkali metal salt of cyclodiene dicarboxylic acid from the reaction zone, and converting the salt to free acid by acidification.

5. Process according to claim 4 in which the finely-divided alkali metal has a particle size of less than 50 microns in diameter.

6. Process according to claim 4 in which the finely-divided alkali metal is dispersed in an inert hydrocarbon liquid.

7. Process according to claim 4 in which the inert hydrocarbon is saturated with $CO_2$ under a pressure of <1 to 1000 p. s. i. g., and in which the reaction with $CO_2$ occurs at a temperature in the range of $20°$ to $100°$ C.

8. Process for producing dicyclopentadiene dicarboxylic acid compounds which comprises adding a slurry of finely-divided sodium cyclopentadienyl in xylene to a solution of xylene saturated with $CO_2$ under pressure of <1 to 1000 p. s. i. g. in a reaction zone at a reaction temperature between $20°$ and $100°$ C., the amount of dissolved $CO_2$ present being in excess of the amount required for carboxylation of the sodium cyclopentadienyl, and separating the sodium salt of dicyclopentadiene dicarboxylic acid from the reaction zone.

9. Process according to claim 8 in which the salt is hydrolyzed by treatment with dilute mineral acid to produce dicyclopentadiene dicarboxylic acid.

References Cited in the file of this patent

Gilman et al.: J. A. C. S., vol. 62, pp. 1301–2 (1940).